Dec. 17, 1963 I. M. WATERS ETAL 3,114,799

TELEVISION CAMERAS

Filed Oct. 29, 1959 2 Sheets-Sheet 1

Inventors
I. M. Waters
Peter Barratt
By Holcomb, Wetherill & Brisebois
Attorneys Inventors
I. M. Waters
Peter Barratt
By
Attorneys United States Patent Office 3,114,799

Patented Dec. 17, 1963

3,114,799

TELEVISION CAMERAS

Ian M. Waters and Peter Barratt, Cambridge, England, assignors to Pye Limited, Cambridge, England, a company of Great Britain Filed Oct. 29, 1959, Ser. No. 849,543
Claims priority, application Great Britain Oct. 30, 1958
19 Claims. (Cl. 178—7.2)

Figure 1:
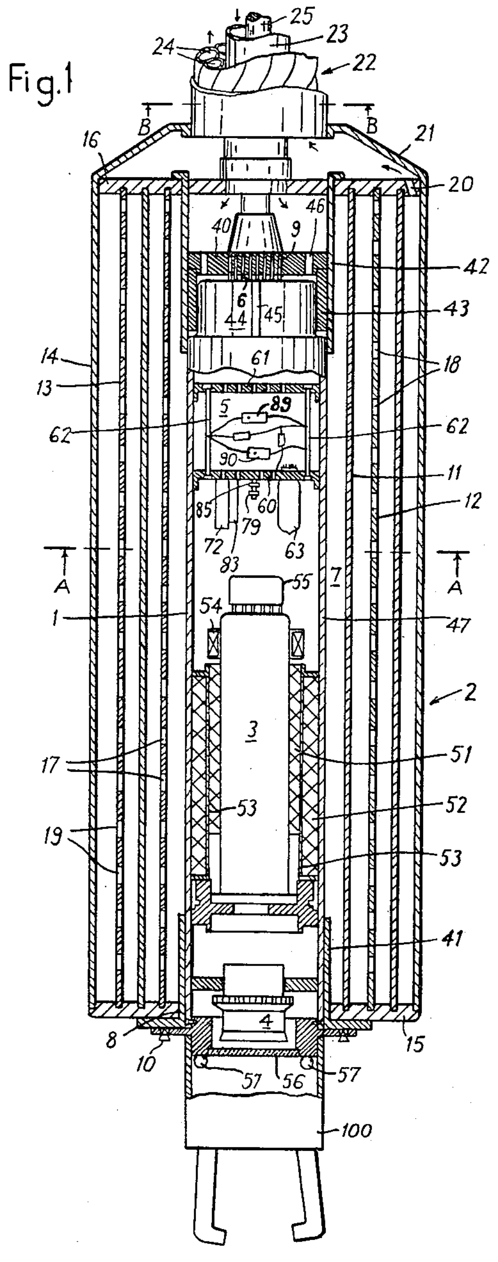

The present invention relates to television cameras that are capable of being used in environments subjected to atomic and nuclear radiation.

It is a specific object of the invention to produce a television camera that is capable of transmitting visual information from within an atomic pile whilst the reactor is in operation or in the close vicinity of a highly radioactive source.

It has hitherto been the practice to insert a television camera into a pile while the pile has been shut off. The life of a graphite-moderated gas-cooled reactor is limited by the life of the pressure vessel that ordinarily encloses it and the life of this vessel is decreased with frequent shutting off and starting up of the pile. It is also expensive repeatedly to put the pile into and out of operation because long time periods are required for these processes, during which no output is obtained. For all these reasons, therefore, it is desirable that a television camera should be able to be used within the pile so as to provide pictures during its operation, and thereby reduce the number of shutdowns required.

Typical radiation conditions which are likely to be met within an atomic pile can be classified as of the order of $10^{13}$ neutrons per square centimetre per second and $10^{6}$ roentgens per hour of one Mev gamma. The temperature is of the order of 300° C. and more and the pressure is of the order of 250 pounds per square inch.

It has hitherto not been thought possible to use a television camera in these circumstances because the essential components hitherto used in television cameras deteriorate and are rendered useless within a very short time under such radiation conditions.

We have now found that if the components and materials incorporated in a television camera be carefully selected, a television camera suitable for operating in highly radioactive environments can be made.

According to the invention, the materials and components incorporated in a television camera are selected to withstand atomic and nuclear radiation. More specifically, the materials and components selected to satisfy, as far as possible, the following requirements:

(*a*) Sufficient resistance to damage by radiation to permit a reasonable operating life under high radiation conditions.

(*b*) A low magnitude of induced radioactivity in order to make it possible to repair a faulty camera within a reasonable time after the camera has been extracted from the pile.

(*c*) A small neutron absorbing cross-section so as to avoid the components having any undue controlling effect on the functioning of the pile itself, or to produce unnecessarily large quantities of heat within the television camera.

Dealing first with requirement (*a*) radiation damage can be considered as occurring on two general scales; the electronic and the atomic or molecular.

Disturbance of electrons results in changes in properties such as electrical conductivity, i.e. properties which depend upon electronic states. Devices which depend upon maintaining well-defined free-electron concentrations, transistors for example, are particularly sensitive to radiation.

Effects on the atomic and molecular scale are often mechanical in nature. Radiation damage then implies the displacement of atoms from crystal lattice positions, and many mechanical properties are sensitive to disruption of the basic structure of the material. Density, elastic properties, yield strength, etc., are all affected to varying degrees by radiation. With compounds, chemical changes occur as the atoms making up molecules are displaced and the molecules broken-up. Materials containing complex molecules suffer drastic changes in physical properties for comparatively small radiation doses; as examples, natural rubber hardens while butyl rubber softens.

Not all the molecular effects are mechanical, however, and optical behaviour can also be affected. Displacement of atoms alters the resonant frequencies of the complicated systems of atoms making up materials, and strong absorption may occur in important regions of the spectrum. Normal optical glass is susceptible to such damage; its transmission coefficient decreases in magnitude and a brown colouration appears.

Table I gives examples of radiation damage in electronic components and materials.

As regards (*b*), the materials selected should have as short a half-life as possible, preferably of the order of hours, minutes or seconds, as opposed to weeks or months so that it is possible to effect repairs to a faulty camera, using suitable equipment, within a reasonable time after the camera has been extracted from the pile. Table II gives the half-life periods of several elements. However, a material which, although having a relatively long half-life, has a relatively low radiation energy so that it does not become prohibitively reactive, can be selected if other considerations make this choice especially desirable. One such material which we select to use is tantalum for the electrolytic condensers as will be later explained.

As regards requirement (*c*), components used should not contain elements with high neutron absorption cross-sections for the incident radiation. Table III gives the neutron absorption cross-sections of a number of elements. Boron and cadmium are quite unsuitable elements to incorporate. Apart from the fact that such elements have an effect on the functioning of the pile itself, the heat which they develop is also undesirable from the equipment point of view.

In order to reduce the selection problems as much as possible, the number of camera components located in the radiation zone should be reduced to the minimum. To this end the camera to be installed in the radiation zone consists only of a camera lens, a television pick-up tube with its associated beam focussing and deflecting means, and the head amplifier for the pick-up tube. The scanning waveform generators, main amplifier, power supplies and other circuits and components can be located in the camera control unit located outside the reactor. The camera components may be enclosed in a casing which is conveniently of elongated cylindrical form, and is preferably constructed in the form of a plug-in camera unit or cartridge so that in the event of a camera fault occurring, the cartridge can be readily removed from its holder or housing and replaced by another cartridge.

As a result of our investigations, we prefer to construct the camera with the following components and materials:

For the parts requiring structural strength and for the casing of the cartridge, we prefer aluminium. However, for the cartridge casing other metals, such as stainless steel, can be used. The fact that stainless steel becomes highly reactive is of less importance for the casing which can be removed for enabling the camera to be serviced. For structural parts required to possess insulating properties, we prefer ceramics. Ceramics may also be used for coil formers. Coil formers may also be made out of the material known under the registered trademark "Tufnol."

For camera lenses, we prefer stabilised glass, substantially boron free. For the end face of the pick-up tube we prefer fused quartz glass or synthetic sapphire. Stabilised glass may also be used. The remaining parts of the tube envelope may be made from ordinary crown glass which is substantially boron-free. Amplifier valves or tubes should have envelopes made of metal or of a glass which is substantially boron-free.

Resistors are preferably wire wound, for example of nickel-chrome wire wound on a ceramic former. Resistors known under the trademark Fiberloy, consisting of a metal film on fibre glass and wound on a ceramic former may also be used.

Wires, both for connections and for winding coils, are preferably of aluminium. The wire surface may be anodised to provide insulation between the turns of a coil. Connections should be made by aluminium soldering.

Capacitors should have aluminium electrodes with either paper, mica or ceramic dielectrics. The electrolytic condensers selected have tantalum electrodes. These are the only electrolytic condensers which we have found to be resistant to radiation damage and can provide the required large capacity while being sufficiently small in size to be suitable for incorporation in the restricted space available in the camera cartridge. Although tantalum possesses a half-life of 111 days, it produces only a very low radiation. At the end of a period of two weeks after removal from a reactor, we found the contact dose rate of tantalum condensers to be 50 milliroentgens per hour of gamma and beta rays. This is not a prohibitively reactive condition and the condensers are safe to handle with tools.

Tantalum electrolytic condensers as at present manufactured by Plessey Limited incorporate a gasket of polytetrafluorethylene which suffers radiation damage. To maintain the mechanical strength, we embed such condensers in a mass of epoxy resin, such as known under the trademark Araldite. A small vent hole is provided in the mass of resin to permit gassing.

Other condensers used preferably have aluminium electrodes with either paper, mica or ceramic as dielectric.

For any flexible seals used in the equipment we prefer to use a silicon-based synthetic rubber, such as known commercially as "Silastomer."

For insulation sleeving which may be required at any part of the wiring, we select silica fibre or polythene.

For electric lamps or light sources, quartz or stabilised glass should be used. Lamp caps should be made of aluminium.

Figures 2, 3:
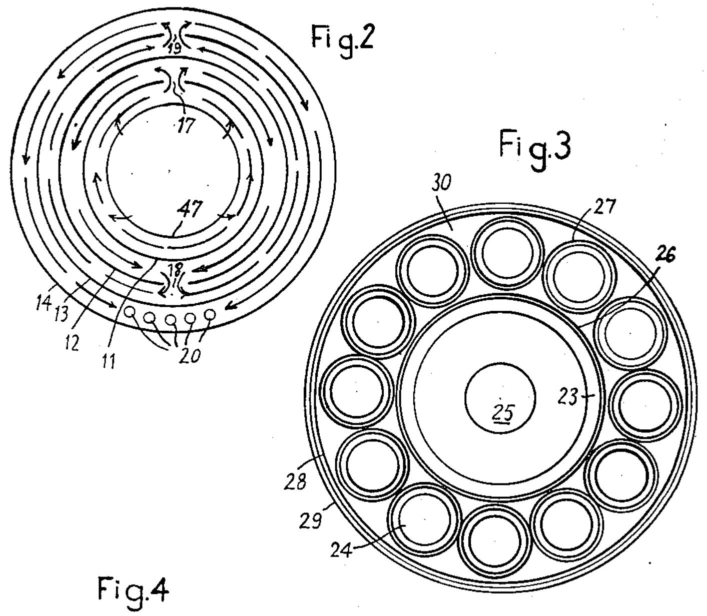
Figure 4:
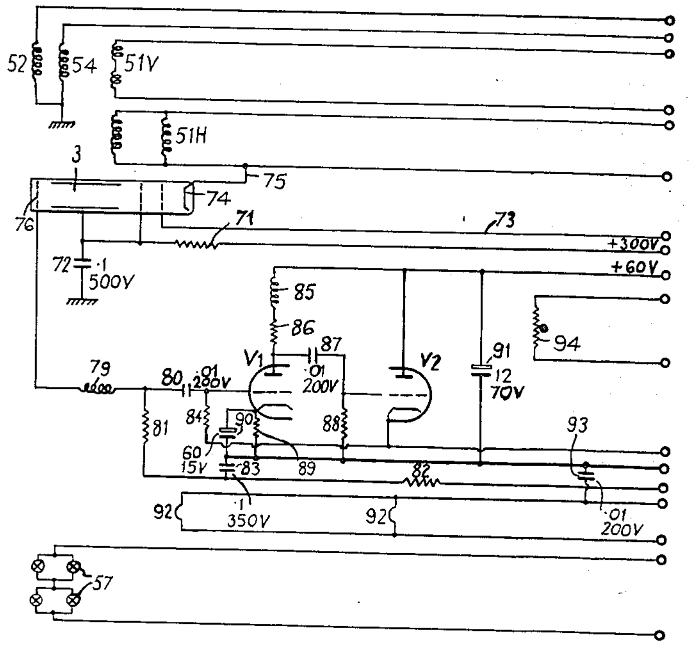

In order that the invention may be more clearly understood, reference will now be made to the accompanying drawings, in which:

FIGURE 1 is a longitudinal section of a television camera assembly for use in an atomic reactor, FIGURE 2 is a section along the line A—A in FIGURE 1, FIGURE 3 is a section along the line B—B in FIGURE 1, FIGURE 4 is a circuit diagram.

The television camera shown in the drawings is designed for operating within a gas-cooled atomic reactor and is constructed in the form of an elongated generally cylindrical unit or cartridge 1 adapted to be plugged into a holder 2 for the cartridge. The cartridge incorporates the pick-up tube 3 and only those components which must be located in close association with the pick-up tube, namely the camera lens 4, the beam controlling coils or electrodes associated with the tube, and its head amplifier 5. The lens 4 is arranged at one end of the cartridge, the other end of which is provided with electrical plug connections 6. The holder 2 has a tubular chamber 7 into which the cartridge 1 can be slid by endwise movement through an opening 8 in one end of the holder, the opposite end of the chamber being provided with an electrical socket connector 9 adapted to receive the plug connections 6 at the end of the cartridge when the latter is inserted in the holder. Latch means 10 may be provided for retaining the cartridge assembled in the holder.

In the embodiment shown, the holder comprises a housing comprising labyrinth passages through which a cooling gas may be circulated so that the housing constitutes a heat insulating buffer for protecting the cartridge from the high ambient temperatures existing in the reactor chamber. As shown, the housing comprises a plurality of concentric cylinders 11, 12, 13 and 14, preferably of stainless steel, which are held together at their ends by end plates 15 and 16 to define annular chambers between adjacent cylinders. The inner cylinder 11 is formed with a row of apertures 17 extending therealong in a line parallel to the axis of the housing. A similar row of apertures 18 is formed in the wall of the cylinder 12 in a position diametrically opposite to the row of apertures 17 in the cylinder 11, and the next cylinder 13 is formed with a row of apertures 19 in a position diametrically opposite to the row of apertures 18 in the cylinder 12. The outer cylinder 14 is imperforate and the end plate 16 is provided with a series of apertures 20 connecting with the outer annular chamber at a position approximately diametrically opposite to the row of apertures 19 provided in the cylinder 13. The end wall 16 is provided with a cover 21 having a central opening in which is fitted a hose assembly 22 consisting of a central tube 23 which is surrounded by a plurality of smaller tubes 24. The central tube serves for the admission of cooling gas and is connected to a central opening in the end plate 16 so that the cooling gas will be fed to the interior of the housing. The smaller tubes 24 connect with the chamber formed between the end cover 21 and the end plate 16 and form return flow passages for cooling gas which has passed through the labyrinth of annular chambers of the housing, in the manner indicated in FIGURE 2, and has been discharged through the apertures 20.

The hose assembly 22 serves for suspending the camera within the atomic pile and also as the means for lowering and withdrawing the camera. The hose may be moved from outside the reactor by any appropriate winding gear (not shown) and is provided at its end outside the reactor chamber with connections for the admission of cooling gas and for exhausting the gas flowing back through the tubes 24.

Within the central tube passes an electric cable 25 containing wires connecting with the socket contacts 9 to the camera control unit arranged outside the reactor.

The hose assembly 22 is preferably flexible and may be constructed as shown in FIGURE 3. The tube 23 conveniently comprises a spiral flexible metal hose which may be surrounded with a layer of heat-insulating material 26, such as a silica fibre. The tubes 24 which are also conveniently of spiral metal flexible construction, are arranged in helical fashion, around the tube 23. They may also be individually covered with heat-insulating material 27. The entire assembly is enclosed in a covering of heat-resistant material 28 and a covering 29 of wire braiding or metal sheathing to protect the hose assembly against physical damage. The spaces 30 between the tubes 24 may be packed with insulating material and may also accommodate lifting or supporting wires.

With the hose construction described the camera cable 25 and the cooling gas being supplied through the tube 23 are protected by the outer sheath of gas-filled tubes 24 and the heat-resistant layers from the high ambient temperature in the reactor. While the gas in the tubes 24 will be hotter than the gas in the inlet tube 23, it will not have the extremely high temperature of the surrounding atmosphere in the reactor.

The cartridge 1 is supported in the housing by the sleeve supports 41, 42 projecting inwardly from the end walls 15, 16 respectively. The sleeve 42 carries the partition 40 which incorporates the socket connector 9. Secured within the sleeve 42, inwardly of the partition 40, is an axially slotted ring 43 having an internal diameter adapted to receive the end cap 44 on the cartridge, the axially extending slot in this ring forming a keyway to receive a key 45 on the end cap 44 to ensure that the cartridge can only fit in the housing in that single position in which the plug pins 6 will engage their corresponding sockets in the connector 9.

The interior of the camera can be cooled by allowing the cooling gas entering through the tube 23, to pass, by way of the openings 46 in the partition 40 and openings in the end cap 44, into the interior of the cartridge, the casing wall 47 of which is provided with one or more slots or apertures through which the air may be discharged into the chamber 7 within the cylinder 11. The slots or apertures in the wall 47 of the cartridge may increase in width, diameter or number in the direction from the end cap 44 to the lens, so that the cooling gas will be caused to flow through the length of the cartridge.

Within the cartridge is located the pick-up tube 3 which is conveniently of the known photo-conductive type, its target being located directly behind the lens 4. Around the tube 3 are located the deflecting coils 51 and the focus coil 52 which may be wound on a suitable former 53, the external diameter of the end cheeks of which is such that it fits within the casing wall 47 to locate the former and the tube 5 centrally therein. The tube 5 is also provided with alignment coils 54 and the contact pins at the end of the tube are connected by a connecting socket 55 to the head amplifier unit generally indicated at 5. This head amplifier conveniently assembled on a frame comprising a pair of end plates 60, 61 separated by spacers 62. One of the end plates 60 carries a valve holder for the valve 63 and also carries other components such as the condensers 72, 83 and the coils 79, 85. Other components of the amplifier may be located between the end plates.

At its front end the cartridge 1 is closed by a window 56. Electric lamps 57 are provided to illuminate the view seen by the lens 4.

The circuit of a suitable head amplifier is shown in FIGURE 4, which also shows the electrical connections from the pins of the plug 6 to the other components in the cartridge. The connectors to the lamps 57, to the focus coil 52, the alignment coil 53, and the vertical deflection coils 51V and the horizontal deflection coils 51H are clear without further explanation. The pick-up tube 5 has its anode connected to +300 volts supply via the resistor 71 and is de-coupled to earth by the capacitor 72. The beam control voltage and vertical blanking pulses are fed to the grid through the conductor 73. Horizontal blanking pulses are derived from the voltage waveform across the horizontal deflection coils 51H and applied to the cathode 74 of the tube 5 by the conductor 75. The pick-up tube therefore acts as its own mixer for the vertical and horizontal blanking pulses. The signal output from the target 76 is fed to the head amplifier which comprises a two-stage resistance coupled amplifier with a cathode follower output.

The output from the target is fed to the grid of the first triode V1 via the compensating coil 79 and the condenser 80. The resistors 81 and 84 constitute the target load resistance and the target D.C. voltage is supplied via resistor 82 de-coupled to ground by the condenser 83. The grid of V1 is connected to the cathode of V2 via the resistor 84. The compensating coil 85 and the anode load resistor 86 are connected in the anode supply to V1, which anode is connected through the condenser 87 to the grid of V2 which is connected to ground by the resistor 88. The biassing resistor 89 connected in the cathode lead of V1 is shunted by the electrolytic condenser 90. The anode of V2 is directly connected to the H.T. supply which is connected to ground by the electrolytic condenser 91. The cathode heaters are indicated at 92 and are de-coupled to ground by the condenser 93.

A suitable double-triode valve for the amplifier described is the valve type E88CC manufactured by the Mullard Radio Valve Company Limited.

By connecting the grid return of V1 to the cathode of V2 a higher value of the cathode biassing resistor 89 is permitted, thus permitting D.C. stabilization of the working point of V1. This direct connection from the cathode of V2 to the grid return of V1 also automatically provides negative feedback to reduce the input impedance of the amplifier. This novel connection provides these advantages without additional components being necessary.

The cartridge may also incorporate a temperature-responsive resistor 94 for giving an indication outside the reactor of the temperature within the cartridge.

The materials and components used in the construction of the television camera are selected so that they have a low magnitude of induced radioactivity and are sufficiently resistant to radiation damage to permit a useful operating life under the high radiation conditions existing in an atomic reactor. The following are the preferred selections for the camera described.

The camera lens is made from stabilised glass. The pick-up tube has its front face made of stabilised glass fused quartz glass or synthetic sapphire. The rest of the tube envelope may be of normal glass but the glass should be free of boron. The envelope of the valve in the heat amplifier should be made of glass which is boron-free, or of metal.

The wires and conductors used are, as far as possible, made of aluminium, preferably pure aluminium, and the wires are joined by aluminium soldering. The focus and deflection coils are wound of aluminium wire, which is anodised to provide insulation between the turns. The focus coil former may be made of aluminium with its surface anodised, in which case it should be slotted to avoid producing a short-circuited turn. Alternatively the former may be made of a ceramic or "Tufnol." The compensating coils are wound of anodised aluminium wire on a ceramic former.

The electrolyitc condensers 90, 91 have tantalum electrodes and the other condensers may have aluminium electrodes with paper or ceramic dielectrics. The resistances are preferably wire wound. Specifically, the resistances 81, 82, 84 and 88 comprise a metal film on fibre glass wound on a ceramic former. Such resistances are commercially available under the trade name Fiberloy. The resistances 71, 86 and 89 are wound with nickel-chrome wire on ceramic formers.

The structural members of the cartridge are made of aluminium or a ceramic. The outer sheathing of the cartridge is also made of aluminium. The lamps used for illuminating are also preferably provided with aluminium caps. Any insulation sleeving provided on the conductors is preferably of silica fibre or polythene.

Tantalum electrolytic condensers as at present commercially manufactured are fitted with a gasket of polytetrafluorethylene which suffers from radiation damage. In order to reinforce the mechanical strength of the tantalum electrolytic condensers, they are each embedded in a mass of an epoxy resin, such as the resin known under the registered trademark Araldite. The resin mass within which the condenser is embedded is provided with a small vent hole to vent any gassing of the electrolyte or the polytetrafluorethylene gasket.

The end of the camera cartridge may be provided with auxiliary devices such as reflecting mirrors, which may be retractable or adjustable, for enabling the camera to see in directions transverse to its axis, or claws, grabs or other tools for enabling various operations to be performed inside the reactor and within the view of the camera. In the drawing such an attachment comprising mechanical grabs 100 is diagrammatically illustrated. These grabs may be remotely actuated by flexible cables or pneumatic or electric motors incorporated in the camera cartridge or the attachment device, the controls passing outside the atomic reactor through the hose assembly.

Alternatively the mirrors, grabs, claws, lights or other attachments may be carried by the housing 2, in which case any control motors may be incorporated in the housing. Any electrical connection required between the camera cable and the accessories may be effected by means of contact rings or equivalent connecting devices provided on the external surface of the cartridge.

When the camera cartridge becomes unserviceable for any reason, it may easily be withdrawn from the housing by means of any appropriate remotely controlled manipulator and delivered, for example by a chute, to an appropriate place for decontamination or destruction. In view of the fact that the components of the cartridge possess a short half-life, it becomes practical for a defective camera unit to be serviced after an appropriate time.

While a particular embodiment has been described it will be understood that various modifications may be made without departing from the scope of the invention. Thus, for example, a pick-up tube employing electrostatic deflection and/or focussing may be employed. The construction of the housing can also be modified by providing more or less annular chambers or alternative heat insulating means, depending upon the ambient temperature encountered. The hose assembly can also be modified and the plurality of outer tubes for the return flow of gas can be replaced by a single outer tube which surrounds the central tube. The smaller tubes 24 of the hose assembly need not all be used for the return flow of cooling gas; some of them may be employed for conveying gas under pressure for operating controls on the camera or housing. Further, in order to cool external parts of the apparatus or the accessories, openings may be provided in the housing through which cooling gas may be discharged on to the part to be cooled.

The sheathing 47 of the cartridge can comprise an aluminium tube, or may be constructed of two semi-cylindrical covers assembled together. The components may be assembled to one cover and the other cover be removable for servicing. Although it is preferred to enclose the camera components in a sheathing, this is not essential and the camera components can be assembled together on an open framework.

*Table II*

| Element | Half-life |
|---|---|
| Aluminium | 2.3 mins. |
| Antimony | 60 days. |
| Arsenic | 27 hours. |
| Bromine | 36 hours. |
| Chromium | 27 days. |
| Cobalt | 5.2 years. |
| Copper $^{64}$ | 12.8 hours. |
| Copper $^{66}$ | 5 mins. |
| Gold | 2.7 days. |
| Iron | 45 days. |
| Magnesium | 9.6 mins. |
| Manganese | 2.6 hours. |
| Potassium | 12.4 hours. |
| Silver | 270 days. |
| Tantalum | 111 days. |
| Tungsten | 24 hours. |
| Zinc $^{65}$ | 250 days. |
| Zinc $^{69}$ | 14 hours. |
| Silicon | 2.65 hours. |
| Oxygen | less than ½ minute. |

*Table III*

| Element | Neutron absorption cross section in barns |
|---|---|
| Cadmium | 2,550 |
| Boron | 769 |
| Mercury | 380 |
| Lead | 170 |
| Silver | 62 |
| Tantalum | 21.3 |
| Manganese | 13.2 |
| Vanadium | 5.1 |
| Nickel | 4.6 |
| Copper | 3.69 |
| Chromium | 2.9 |
| Iron | 2.53 |
| Molybdenum | 2.5 |
| Zinc | 1.06 |
| Tin | 0.60 |
| Hydrogen | 0.33 |
| Aluminium | 0.23 |
| Silicon | 0.13 |
| Beryllium | 0.01 |
| Carbon | 0.0032 |
| Oxygen | Less than 0.0002 |

We claim:

1. A television camera wherein the materials and components incorporated therein are selected to withstand atomic and nuclear radiation so that the camera can be inserted into a nuclear reactor and will operate when exposed to the high radiation conditions existing wherein the reactor when the reactor is operating, that is to say radiation conditions of the order of $10^{13}$ neutrons per square centimetre per second and $10^6$ roentgens per hour of one mev.-gamma, a temperature of at least 300° C. and a pressure of at least 250 pounds per square inch, wherein said camera comprises a casing incorporating a lens, a

*Table I*

| Component or material | Radiation dose or flux | Radiation damage |
|---|---|---|
| Capacitors—electrolytic (boron containing) | $10^{-7}$ n. cm.$^{-2}$ approx. | Failure due to gas evolution |
| | $10^{16}$ gamma cm.$^{-2}$ +$10^{17}$ n. cm.$^{-2}$ | Capacitance decrease approx. 10%; power factor decreases 3% to 30%. |
| Capacitors—electrolytic (tantalum) | Greater than $2\times10^{15}$ thermal n. cm.$^{-2}$ and $2\times10^{14}$ fast n. cm$^{-2}$<br>$1.5\times10^{12}$ n. cm$^{-2}$ sec.$^{-1}$ | No significant change in properties. |
| Capacitors—oil-filled | $10^{18}$ n. cm.$^{-2}$ or +$5\times10^{15}$ gamma cm.$^{-2}$ | Oil leakage; capacitance decreases approx. 10%. |
| Capacitors—paper and mica | +$10^{17}$ n. cm.$^{-2}$ or +$10^{16}$ gamma cm.$^{-2}$ | Worst effect observed is capacitance change of a few percent. |
| Capacitors—ceramic | $10^{14}$ n. cm.$^{-2}$ | Capacitance decrease of approx. 1% and power factor decrease approx. −0.1%. |
| | $10^{18}$ n. cm.$^{-2}$ | Negligible changes. |
| | $5\times10^{16}$ n. cm.$^{-2}$ and $5\times10^{15}$ gamma cm.$^{-2}$. | No detectable integrated effect in capacitance; rate effect may be −5% capacitance change. |
| Resistors—wire-wound | +$3.6\times10^{16}$ n. cm.$^{-2}$ and +3.6+$10^{15}$ gamma cm.$^{-2}$. | Resistance change less than 0.5%. |
| Resistors—carbon | $10^{18}$ n. cm.$^{-2}$ and $10^{17}$ gamma cm.$^{-2}$ | Resistance decrease of few percent and rate effect negligible. |
| Valves | +$10^{17}$ n. cm.$^{-2}$ | Some fail due to glass damage by $10^{17}$ n. cm.$^{-2}$; others show no apparent damage by $10^{13}$ n. cm.$^{-2}$. |
| Television tubes | Approx. $10^{11}$ n. cm.$^{-2}$ sec.$^{-1}$ and $10^{15}$ gamma cm.$^{-2}$ sec.$^{-1}$. | Considerable increase in dark current (rate effect); integrated effect negligible apart from glass darkening. |
| Plastic insulants | Approx. $10^{17}$ n. cm.$^{-2}$ or +5.$10^7$ rad | Considerable changes in mechanical properties of most plastics. Insulation resistance may decrease by a factor of $10^3$. |
| Semi-conductor Devices | $10^{13}$ to $10^{16}$ n. cm.$^{-2}$ | Germanium diodes tend to become ohmic, and resistance and leakage currents may increase by several hundred percent. Silicon diodes show high leakage currents and increases in back and forward resistances. Loss of amplification in germanium transistors by $10^{14}$ n. cm.$^{-2}$. |
| Glass | $10^{14}$ n. cm.$^{-2}$ or $10^7$ rad | Discolouration. |

television pick-up tube and its associated beam deflecting and focussing means and a head amplifier fed with the output signal from the pick-up tube, and wherein substantially all of the components and materials of said camera consist of atoms having a neutron absorption cross-section of less than 0.25 barn and the majority of said materials and components have a half life not greater than 24 hours.

2. A television camera as claimed in claim 1, wherein tantalum electrolytic condensers are used.

3. A television camera as claimed in claim 1, wherein the camera lens is made of stabilised glass.

4. A television camera as claimed in claim 1, wherein at least the end face of the pick-up tube is made of quartz glass.

5. A television camera as claimed in claim 1, wherein at least the end face of the pick-up tube is made of synthetic sapphire.

6. A television camera as claimed in claim 1, wherein at least the end face of the pick-up tube is made of stabilised glass.

7. A television camera as claimed in claim 1, wherein the resistors are wire wound.

8. A television camera as claimed in claim 1, wherein the camera unit for location in the radiation zone comprises only a lens, a pick-up tube and its associated beam deflecting and focussing means, and the head amplifier for the pick-up tube, the camera components being enclosed in a casing of aluminium.

9. A television camera as claimed in claim 8, wherein the camera unit is mounted in a housing comprising chambers through which a cooling gas is caused to flow.

10. A television camera as claimed in claim 1, wherein aluminium wires are used for connections and coils.

11. A television camera as claimed in claim 10, wherein the wiring joints are made by aluminium soldering.

12. A television camera as claimed in claim 10, wherein mechanical structural parts of the camera are made of aluminium.

13. A television camera as claimed in claim 12, wherein structural parts to be made of insulating material are made of ceramics.

14. A television camera as claimed in claim 13, wherein coil formers are made of ceramics.

15. A television camera unit comprising an elongated generally cylindrical casing made of aluminium and incorporating a lens adjacent one end of the casing, a photoconductive pick-up tube arranged with its target behind said lens, and a head amplifier, wherein the lens is made of stabilised glass, the pickup tube has the target and face made of substantially boron-free transparent material and is provided with focussing and deflecting coils wound of aluminium wire, and the head amplifier comprises a two-stage resistance coupled valve amplifier of which the resistances are wire wound on ceramic formers, the electrolytic condensers comprise tantulum electrodes, the other condensers have aluminium electrodes, and the wiring of the circuits is effected by aluminium wire.

16. A television camera as claimed in claim 15, wherein the head amplifier comprises a two-stage resistance coupled valve amplifier having a cathode follower output, the grid of the first valve stage being directly connected to the cathode of the cathode follower valve stage through a resistance.

17. A television camera as claimed in claim 15, wherein horizontal blanking pulses are derived from the voltage waveform across the horizontal deflecting coils and applied to the cathode of the pick-up tube.

18. A television camera unit for use in an atomic reactor, comprising a lens, a television pick-up tube having a target and associated beam deflecting focussing means, a head amplifier for the pick-up tube, and structural means assembling the components as a unit with the lens at one end thereof and the pick-up tube arranged with its target behind the lens, wherein the lens is made of a material selected from the group consisting of boron-free stabilised glass and quartz glass; the pick-up tube is made of boron-free glass with its target end face made of a material selected from the group consisting of stabilised glass, quartz glass and synthetic sapphire; the beam deflecting and focussing means comprise coils wound of aluminium wire having its surface anodised to provide insulation between the turns of the coils; the head amplifier is a resistance-coupled valve amplifier, the valves have envelopes made of substantially boron-free glass, the resistors are wound resistors, the electrolytic condensers have tantalum electrodes, other condensers have aluminium electrodes, the wiring of the circuit comprises aluminium wire and the joints are effected by aluminium soldering; and the structural means and other mechanical structural parts are made of a material selected from the group consisting of aluminium, stainless steel and ceramics.

19. A television camera unit as claimed in claim 18, wherein the head amplifier comprises a two-stage resistance coupled valve amplifier having a cathode follower output, the grid of the first valve stage being directly connected to the cathode of the cathode follower valve stage through a resistance.

References Cited in the file of this patent

UNITED STATES PATENTS 2,852,600 Jenkins ---------------- Sept. 16, 1958

OTHER REFERENCES

Publication: "Closed-Circuit Television Systems," RCA Service Co., copyright 1958; Addenda Sec. 2–42 and 2–43; Addenda, pp. 15 to 18.